United States Patent
Zhong et al.

(10) Patent No.: US 10,848,344 B2
(45) Date of Patent: Nov. 24, 2020

(54) SERVICE SENDING METHOD AND APPARATUS, SERVICE RECEIVING METHOD AND APPARATUS, AND NETWORK SYSTEM

(71) Applicant: HUAWEI TECHNOLOGIES CO., LTD., Guangdong (CN)

(72) Inventors: Qiwen Zhong, Shenzhen (CN); Xiaofei Xu, Beijing (CN); Xiaojun Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 38 days.

(21) Appl. No.: 16/236,845

(22) Filed: Dec. 31, 2018

(65) Prior Publication Data

US 2019/0140861 A1 May 9, 2019

Related U.S. Application Data

(63) Continuation of application No. PCT/CN2017/080316, filed on Apr. 12, 2017.

(30) Foreign Application Priority Data

Jul. 1, 2016 (CN) .......................... 2016 1 0514068

(51) Int. Cl.
*H04L 12/43* (2006.01)
*H04L 12/40* (2006.01)
(Continued)

(52) U.S. Cl.
CPC ...... *H04L 12/40169* (2013.01); *H04J 3/1658* (2013.01); *H04J 3/1694* (2013.01);
(Continued)

(58) Field of Classification Search
None
See application file for complete search history.

(56) References Cited

U.S. PATENT DOCUMENTS

| 2003/0022672 A1 | 1/2003 | Yoshii et al. |
| 2006/0265212 A1 | 11/2006 | Fitzgerald |

(Continued)

FOREIGN PATENT DOCUMENTS

| CN | 1846408 A | 10/2006 |
| CN | 101146345 A | 3/2008 |

(Continued)

OTHER PUBLICATIONS

Extended European Search Report issued in European Application No. 17818891.8 dated Mar. 13, 2019, 8 pages.

(Continued)

*Primary Examiner* — Brandon M Renner
(74) *Attorney, Agent, or Firm* — Fish & Richardson P.C.

(57) ABSTRACT

The present disclosure relates to a service sending method and apparatus, and a service receiving method and apparatus. One example service sending method includes obtaining, by a network device, a first data stream and a second data stream, and inserting the first data stream into the second data stream to generate a third data stream. The third data stream includes a first information block and a second information block, the first information block is used to carry the first data stream, the second information block is used to carry a first data stream distribution indication map, the first data stream distribution indication map is used to indicate a location of the first information block, and the second information block is identified by using a preset map block type.

23 Claims, 11 Drawing Sheets

(51) Int. Cl.
*H04J 3/16* (2006.01)
*H04L 12/413* (2006.01)
*H04J 3/07* (2006.01)
*H04L 25/49* (2006.01)

(52) U.S. Cl.
CPC ............ *H04L 12/40* (2013.01); *H04L 12/413* (2013.01); *H04J 3/07* (2013.01); *H04J 2203/0085* (2013.01); *H04J 2203/0091* (2013.01); *H04L 25/49* (2013.01)

(56) References Cited

U.S. PATENT DOCUMENTS

| | | | |
|---|---|---|---|
| 2008/0075110 A1* | 3/2008 | Fourcand | H04L 12/43 370/458 |
| 2009/0103487 A1 | 4/2009 | Oh et al. | |
| 2014/0146835 A1 | 5/2014 | Hoyer et al. | |
| 2015/0055664 A1* | 2/2015 | Kanonakis | H04L 12/40136 370/535 |
| 2016/0028586 A1* | 1/2016 | Blair | H04B 10/27 398/45 |
| 2016/0119075 A1 | 4/2016 | Gareau et al. | |
| 2017/0201323 A1* | 7/2017 | Prakash | H04Q 11/0001 |
| 2018/0076932 A1* | 3/2018 | Okada | H04L 12/40156 |

FOREIGN PATENT DOCUMENTS

| | | |
|---|---|---|
| CN | 101399800 A | 4/2009 |
| CN | 104579764 A | 4/2015 |
| EP | 2139204 A1 | 12/2009 |
| JP | H11355195 A | 12/1999 |
| JP | 2002171213 A | 6/2002 |
| JP | 2007504735 A | 3/2007 |
| WO | 2009089905 A1 | 7/2009 |

OTHER PUBLICATIONS

Office Action issued in Japanese Application No. 2018-568914 dated Feb. 4, 2020, 9 pages (with English translation).
Multi-link Gearbox Implementation Agreement 3.0, IA # OIF-MLG-03.0, Physical and Link Layer, Apr. 2016, 127 pages.
Flex Ethernet Implementation Agreement 1.0, IA OIF-FLEXE-01.0, Physical and Link Layer, Mar. 2016, 31 pages.
International Search Report and Written Opinion issued in International Application No. PCT/CN2017/080316 dated Jun. 19, 2017, 16 pages.
Chinese Office Action issued in Chinese Application No. 201610514068 dated Aug. 3, 2018, 8 pages.
Chinese Search Report issued in Chinese Application No. 2016105140680 dated Jul. 25, 2018, 2 pages.

* cited by examiner

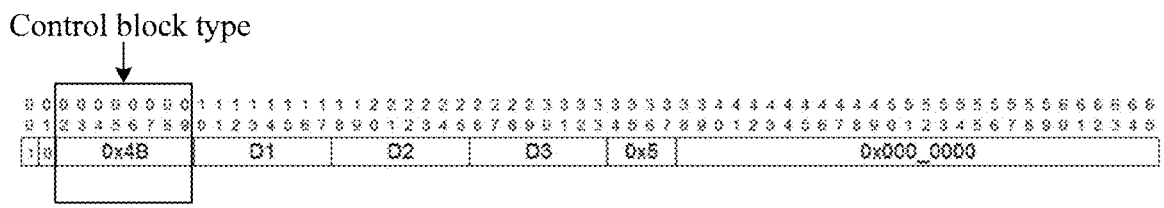
FIG. 4
Control block type
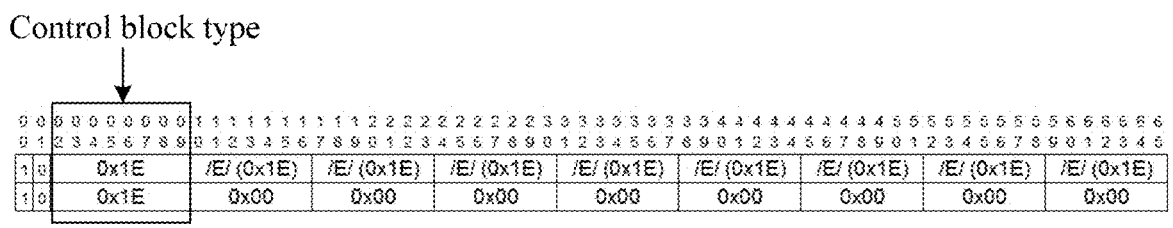
FIG. 5a
Control block type
FIG. 5b

| 1 | 2 | 3 | 4 | 5 | 6 | 7 | 8 | 9 | 10 | 11 | 12 | 13 | 14 | 15 | 16 | 17 | 18 | 19 | 20 | Idle block distribution indication map |
|---|---|---|---|---|---|---|---|---|---|---|---|---|---|---|---|---|---|---|---|---|
| /I/ | D/C | D/C | D/C | D/C | D/C | D/C | D/C | D/C | D/C | /I/ | D/C | /I/ | D/C | D/C | D/C | /I/ | D/C | D/C | D/C | 0111,1111,1010,1111,0111 |
| D/C | D/C | D/C | D/C | D/C | D/C | D/C | D/C | D/C | D/C | D/C | D/C | D/C | D/C | D/C | D/C | D/C | D/C | D/C | D/C | 1111,1111,1111,1111,1111 |
| D/C | D/C | /I/ | D/C | D/C | D/C | D/C | D/C | D/C | D/C | D/C | D/C | D/C | D/C | D/C | D/C | D/C | D/C | D/C | D/C | 1101,1111,1111,1111,1111 |
| D/C | D/C | /I/ | D/C | D/C | D/C | D/C | D/C | D/C | D/C | D/C | D/C | D/C | D/C | D/C | D/C | D/C | D/C | D/C | D/C | 1101,1111,1111,1111,1111 |
| D/C | D/C | /I/ | D/C | D/C | /I/ | D/C | D/C | D/C | D/C | /I/ | D/C | D/C | D/C | /I/ | D/C | D/C | D/C | D/C | D/C | 1101,1011,1101,1101,1111 |
| D/C | /I/ | /I/ | /I/ | D/C | D/C | /I/ | D/C | /I/ | D/C | /I/ | D/C | D/C | D/C | /I/ | D/C | /I/ | D/C | D/C | D/C | 1000,1101,0101,1101,0111 |
| D/C | /I/ | /I/ | /I/ | D/C | D/C | /I/ | /I/ | /I/ | D/C | D/C | /I/ | /I/ | /I/ | D/C | D/C | D/C | /I/ | /I/ | /I/ | 1000,1100,0110,0011,1000 |
| D/C | D/C | D/C | D/C | D/C | D/C | /I/ | /I/ | D/C | D/C | D/C | D/C | D/C | D/C | D/C | D/C | D/C | D/C | D/C | D/C | 1111,1100,1111,1111,1111 |
| /I/ | /I/ | /I/ | D/C | D/C | D/C | D/C | D/C | D/C | D/C | D/C | D/C | D/C | D/C | D/C | D/C | D/C | D/C | D/C | D/C | 0001,1111,1111,1111,1111 |
| ⋮ | | | | | | | | | | | | | | | | | | | | |
| /I/ | /I/ | /I/ | /I/ | /I/ | /I/ | /I/ | /I/ | /I/ | /I/ | /I/ | /I/ | /I/ | /I/ | /I/ | /I/ | /I/ | /I/ | /I/ | /I/ | 0000,0000,0000,0000,0000 |

/I/ Idle block    D/C Non-idle block

FIG. 8

| 1 | 2 | 3 | 4 | 5 | 6 | 7 | 8 | 9 | 10 | 11 | 12 | 13 | 14 | 15 | 16 | 17 | 18 | 19 | 20 | Service distribution indication map |
|---|---|---|---|---|---|---|---|---|---|---|---|---|---|---|---|---|---|---|---|---|
| Map | D/C | D/C | D/C | D/C | D/C | D/C | D/C | D/C | D/C | BE | D/C | BE | D/C | D/C | D/C | BE | D/C | D/C | D/C | 0111,1111,1010,1111,0111 |
| D/C | D/C | D/C | D/C | D/C | D/C | D/C | D/C | D/C | D/C | D/C | D/C | D/C | D/C | D/C | D/C | D/C | D/C | D/C | D/C | 1111,1111,1111,1111,1111 |
| D/C | D/C | /I/ | D/C | D/C | D/C | D/C | D/C | D/C | D/C | D/C | D/C | D/C | D/C | D/C | D/C | D/C | D/C | D/C | D/C | 1101,1111,1111,1111,1111 |
| D/C | D/C | /I/ | D/C | D/C | D/C | D/C | D/C | D/C | D/C | D/C | D/C | D/C | D/C | D/C | D/C | D/C | D/C | D/C | D/C | 1101,1111,1111,1111,1111 |
| D/C | D/C | Map | D/C | D/C | BE | D/C | D/C | D/C | D/C | BE | D/C | D/C | D/C | BE | D/C | D/C | D/C | D/C | D/C | 1101,1011,1101,1101,1111 |
| D/C | Map | BE | BE | D/C | D/C | BE | D/C | BE | D/C | BE | D/C | D/C | D/C | BE | D/C | BE | D/C | D/C | D/C | 1000,1101,0101,1101,0111 |
| D/C | Map | BE | BE | D/C | D/C | BE | BE | BE | D/C | D/C | BE | BE | BE | D/C | D/C | D/C | BE | BE | BE | 1000,1100,0110,0011,1000 |
| D/C | D/C | D/C | D/C | D/C | D/C | Map | BE | D/C | D/C | D/C | D/C | D/C | D/C | D/C | D/C | D/C | D/C | D/C | D/C | 1111,1100,1111,1111,1111 |
| Map | BE | BE | D/C | D/C | D/C | D/C | D/C | D/C | D/C | D/C | D/C | D/C | D/C | D/C | D/C | D/C | D/C | D/C | D/C | 0001,1111,1111,1111,1111 |
| ⋮ | | | | | | | | | | | | | | | | | | | | |
| Map | BE | BE | BE | BE | BE | BE | BE | BE | BE | BE | BE | BE | BE | BE | BE | BE | BE | BE | BE | 0000,0000,0000,0000,0000 |

/I/ Unused idle block    D/C Non-idle block
Map block    BE service block

FIG. 9

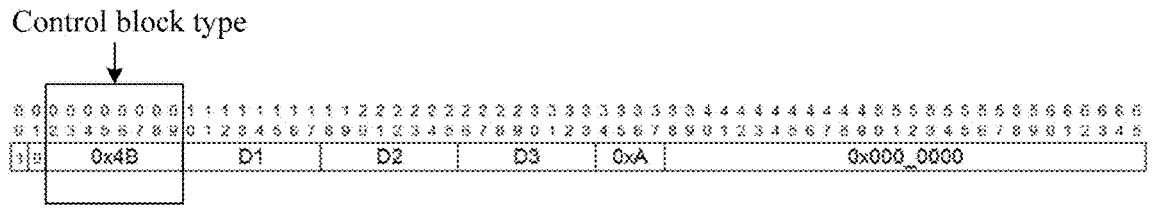
FIG. 10a
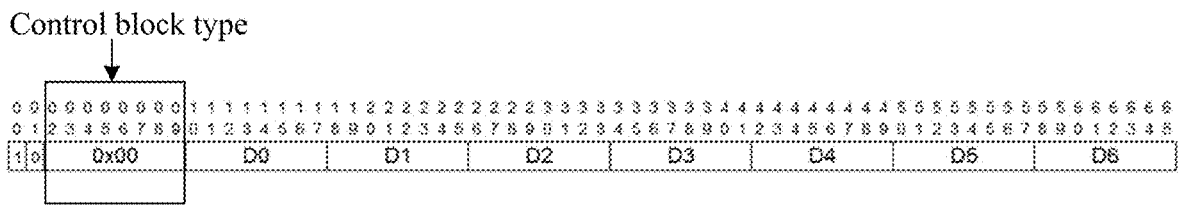
FIG. 10b
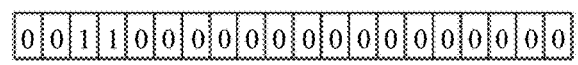
FIG. 11
FIG. 12

| block # | SH | 0 1 | 2 | 3 4 5 6 7 | 8 9 10 11 12 13 14 15 16 17 18 19 20 21 22 23 24 25 26 27 28 29 30 31 | 32 33 34 35 | 36 37 38 39 40 41 42 43 44 45 46 47 48 49 50 51 52 53 54 55 56 57 58 59 60 61 62 63 |
|---|---|---|---|---|---|---|---|
| 1 | 1 0 | | | 0x4B | FlexE Group Number | 0x5 | 0x000_0000 |
| 2 | 0 1 | C | Res | PHY Map | | | Reserved |
| 3 | 0 1 | C | RPF OMF | PHY Number | | | Reserved |
| 4 | | s s | | Client Calendar A | Client Calendar B | CRCA | CRC-16 |
| 5 | | s s | | Management Channel - Section (two 66B blocks) | | | |
| 6 | | s s | | | | | |
| 7 | | s s | | Management Channel - Shim to Shim (three 66B blocks) | | | |
| 8 | | s s | | | | | |

Bit Position

C = Calendar configuration in use
OMF = Overhead Multiframe indicator
RPF = Remote PHY Fault
CR = Calendar Switch Request
CA = Calendar Switch Acknowledge
s s = Valid sync header bits (01 or 10)

PHY Map = Control of which PHYs are members of this group
PHY Number = Identity of this PHY within the group
FlexE Group Number
Client (being programmed)
Reserved
Management Channels
CRC-16

SERVICE SENDING METHOD AND APPARATUS, SERVICE RECEIVING METHOD AND APPARATUS, AND NETWORK SYSTEM

CROSS-REFERENCE TO RELATED APPLICATIONS

This application is a continuation of International Application No. PCT/CN2017/080316, filed on Apr. 12, 2017, which claims priority to Chinese Patent Application No. 201610514068.0, filed on Jul. 1, 2016. The disclosures of the aforementioned applications are hereby incorporated by reference in their entireties.

TECHNICAL FIELD

This application relates to the communications field, and in particular, to a service sending method and apparatus, a service receiving method and apparatus, and a network system.

BACKGROUND

Flexible Ethernet (FlexE), which combines some technical characteristics of Ethernet and transport networks (for example, an optical transport network (OTN) and a synchronous digital hierarchy (SDH)), is an important milestone in evolution of Ethernet technologies. As a flexible Ethernet technology emerges, an Ethernet interface presents a virtualized characteristic. A plurality of Ethernet physical interfaces are cascaded, to support several virtual logical ports. For example, a 400 Gigabit (400G) flexible Ethernet physical interface group formed by cascading four 100 Gigabit Ethernet (100GE) physical interfaces can support several logical ports. A bandwidth of each logical port may be flexibly adjusted, and a total bandwidth of the four 100G physical interfaces is shared between all the logical ports. Services of different bandwidths can be flexibly transmitted in such a manner.

Currently, flexible Ethernet uses a time division multiplexing (TDM) transmission manner, that is, timeslot division is performed on a bandwidth of a flexible Ethernet physical interface. A logical port may include several timeslots. As described above, the 400G flexible Ethernet physical interface group formed by cascading the four 100GE physical interfaces may be divided into 80 timeslots with a granularity of 5G Several timeslots are allocated to each service, and the allocated timeslots are exclusive to the service.

As shown in FIG. 1, three services C1, C2, and C3 are transmitted between a network device Pa and a network device Pb, and each service occupies a specified timeslot bandwidth. For example, the service C1 occupies two timeslots, and the two timeslots cannot be shared by the services C2 and C3, or another service. The same is true for the services C2 and C3. If these services are packet services with relatively low traffic, for example, Ethernet services with relatively low traffic, in timeslots occupied by these services, a large quantity of interpacket gaps (IPG), for example, idle (Idle) information, are transmitted between the network devices. The idle (Idle) information actually carries no data information of the service, causing a waste of timeslot bandwidth resources.

SUMMARY

In view of this, embodiments of the present invention provide a service sending method and apparatus, a service receiving method and apparatus, and a network system, so that a waste of timeslot resources during a service transmission process of flexible Ethernet can be avoided.

According to a first aspect, an embodiment of the present invention provides a service sending method, including: obtaining, by a network device, at least two data streams, where the at least two data streams include a first data stream and a second data stream; inserting the first data stream into the second data stream, to generate a third data stream, where the third data stream includes a first information block and a second information block, the first information block and the second information block are generated from the second data stream, the first information block is used to carry the first data stream, the second information block is used to carry a first data stream distribution indication map, the first data stream distribution indication map is used to indicate a location of the first information block, and the second information block is identified by using a preset map block type; and sending the third data stream. In this embodiment of the present invention, the first data stream is carried by using the second data stream, thereby improving bandwidth utilization. The second data stream may be formed by a service with an exclusive bandwidth, and the first data stream may be formed by a best effort (BE) service. Statistical multiplexing of a service can be implemented in flexible Ethernet by using idle timeslot resources of the second data stream.

In a possible implementation, the method further includes: obtaining the second data stream, identifying at least two idle blocks in the second data stream, and generating the first information block and the second information block at locations of the at least two idle blocks. An idle block in the second data stream is identified, and is used to carry the first data stream and the first data stream distribution indication map, thereby fully utilizing the idle timeslot resources. Optionally, another redundancy information block, for example, an ERROR block, may further be identified, thereby further utilizing redundancy timeslot resources.

In a possible implementation, the generating the first information block and the second information block at locations of the at least two idle blocks includes: inserting the first data stream into the first information block; and generating the first data stream distribution indication map based on the location of the first information block, and inserting the first data stream distribution indication map into the second information block. Optionally, the first data stream may be first inserted into the first information block, and then the first data stream distribution indication map is generated; or the first data stream distribution indication map may be first generated, and then the first data stream is inserted into the first information block. The location of the first information block may be indicated by using the first data stream distribution indication map, so that a receive end device extracts the first data stream from the third data stream.

In a possible implementation, the identifying at least two idle blocks in the second data stream includes: obtaining a first segment data stream from the second data stream, and identifying idle blocks in the first segment data stream to obtain at least two idle blocks, where the idle block carries an idle block type. The second data stream is processed in segments, and the first data stream can be inserted in segments, thereby reducing a processing delay.

In a possible implementation, after the identifying at least two idle blocks in the second data stream, the method further includes: generating an idle block distribution indication map, where the idle block distribution indication map is used to indicate the locations of the at least two idle blocks and/or a location of a non-idle block; and generating the first data stream distribution indication map based on the idle block distribution indication map.

In a possible implementation, the method further includes: obtaining a second segment data stream from the second data stream, identifying at least two idle blocks in the second segment data stream, and generating the first information block and the second information block at locations of the at least two idle blocks; and indicating a location of the second segment data stream by using preset participation information. A location into which the first data stream can be inserted or a location into which the first data stream cannot be inserted can be indicated in a manner such as masking, thereby implementing flexible insertion of the first data stream.

In a possible implementation, the method further includes: adjusting a location of the second information block to a first location in the first segment data stream or the second segment data stream. The location of the second information block, the first segment data stream, or the second segment data stream is rearranged, so that data restoration efficiency of the receive end device can be improved.

According to a second aspect, an embodiment of the present invention provides a service receiving method, including: receiving, by a network device, a third data stream; and extracting a first data stream from the third data stream, and restoring the third data stream to a second data stream, where the third data stream includes a first information block and a second information block, the second data stream is restored by using the first information block and the second information block, the first information block is used to carry the first data stream, the second information block is used to carry a first data stream distribution indication map, the first data stream distribution indication map is used to indicate a location of the first information block, and the second information block is identified by using a preset map block type. In this embodiment of the present invention, the first data stream is extracted from the third data stream, and the third data stream is restored to the second data stream, thereby improving bandwidth utilization. The second data stream may be formed by a service with an exclusive bandwidth, and the first data stream may be formed by a BE service. Statistical multiplexing of a service can be implemented in flexible Ethernet by using idle timeslot resources of the second data stream.

In a possible implementation, the extracting a first data stream from the third data stream includes: obtaining a first segment data stream or a second segment data stream from the third data stream; identifying the second information block in the first segment data stream or the second segment data stream, and obtaining the first data stream distribution indication map from the second information block; and obtaining the first data stream from the first information block based on the first data stream distribution indication map. The third data stream is processed in segments, and the first data stream can be inserted in segments, thereby reducing a processing delay. The location of the first information block may be indicated by using the first data stream distribution indication map, so that a receive end device extracts the first data stream from the third data stream.

In a possible implementation, the method further includes: obtaining preset participation information, and obtaining the second segment data stream from the third data stream based on the preset participation information, where the preset participation information indicates a location of the second segment data stream; and obtaining the first data stream from the second segment data stream. A location from which the first data stream can be extracted or a location from which the first data stream cannot be extracted can be indicated in a manner such as masking, thereby implementing flexible extraction of the first data stream.

In a possible implementation, the extracting a first data stream from the third data stream includes: obtaining the first data stream distribution indication map from a first location in the first segment data stream or the second segment data stream. The location of the second information block, the first segment data stream, or the second segment data stream is rearranged, so that data restoration efficiency of the receive end device can be improved.

In a possible implementation, the first data stream distribution indication map identifies the location of the first information block by using a first bit.

In a possible implementation, that the second data stream is restored by using the first information block and the second information block includes: generating at least two idle blocks at locations of the first information block and the second information block, where the idle block carries an idle block type.

According to a third aspect, an embodiment of the present invention provides a service sending apparatus, including: an obtaining module, configured to obtain at least two data streams, where the at least two data streams include a first data stream and a second data stream; a processing module, configured to insert the first data stream into the second data stream, to generate a third data stream, where the third data stream includes a first information block and a second information block, the first information block and the second information block are generated from the second data stream, the first information block is used to carry the first data stream, the second information block is used to carry a first data stream distribution indication map, the first data stream distribution indication map is used to indicate a location of the first information block, and the second information block is identified by using a preset map block type; and a sending module, configured to send the third data stream. In this embodiment of the present invention, the first data stream is carried by using the second data stream, thereby improving bandwidth utilization. The second data stream may be formed by a service with an exclusive bandwidth, and the first data stream may be formed by a BE service. Statistical multiplexing of a service can be implemented in flexible Ethernet by using idle timeslot resources of the second data stream.

The method embodiment in the first aspect can be implemented by using the apparatus embodiment in the third aspect.

In a possible implementation, the processing module is further configured to: obtain the second data stream, identify at least two idle blocks in the second data stream, and generate the first information block and the second information block at locations of the at least two idle blocks.

In a possible implementation, the processing module is configured to: insert the first data stream into the first information block; and generate the first data stream distribution indication map based on the location of the first information block, and insert the first data stream distribution indication map into the second information block.

In a possible implementation, the processing module is configured to: obtain a first segment data stream from the second data stream, and identify idle blocks in the first segment data stream to obtain at least two idle blocks, where the idle block carries an idle block type.

In a possible implementation, the processing module is further configured to: generate an idle block distribution indication map, where the idle block distribution indication map is used to indicate the locations of the at least two idle blocks and/or a location of a non-idle block; and generate the first data stream distribution indication map based on the idle block distribution indication map.

In a possible implementation, the processing module is further configured to: obtain a second segment data stream from the second data stream, identify at least two idle blocks in the second segment data stream, and generate the first information block and the second information block at locations of the at least two idle blocks; and indicate a location of the second segment data stream by using preset participation information.

In a possible implementation, the processing module is further configured to: adjust a location of the second information block to a first location in the first segment data stream or the second segment data stream.

According to a fourth aspect, an embodiment of the present invention provides a service receiving apparatus, including: a receiving module, configured to receive a third data stream; and a processing module, configured to: extract a first data stream from the third data stream, and restore the third data stream to a second data stream, where the third data stream includes a first information block and a second information block, the second data stream is restored by using the first information block and the second information block, the first information block is used to carry the first data stream, the second information block is used to carry a first data stream distribution indication map, the first data stream distribution indication map is used to indicate a location of the first information block, and the second information block is identified by using a preset map block type. In this embodiment of the present invention, the first data stream is extracted from the third data stream, and the third data stream is restored to the second data stream, thereby improving bandwidth utilization. The second data stream may be formed by a service with an exclusive bandwidth, and the first data stream may be formed by a BE service. Statistical multiplexing of a service can be implemented in flexible Ethernet by using idle timeslot resources of the second data stream.

The method embodiment in the second aspect can be implemented by using the apparatus embodiment in the fourth aspect.

In a possible implementation, the processing module is configured to: obtain a first segment data stream or a second segment data stream from the third data stream; identify the second information block in the first segment data stream or the second segment data stream, and obtain the first data stream distribution indication map from the second information block; and obtain the first data stream from the first information block based on the first data stream distribution indication map.

In a possible implementation, the processing module is further configured to: obtain preset participation information, and obtain the second segment data stream from the third data stream based on the preset participation information, where the preset participation information indicates a location of the second segment data stream.

In a possible implementation, the processing module is further configured to: obtain the first data stream distribution indication map from a first location in the first segment data stream or the second segment data stream.

In a possible implementation, the first data stream distribution indication map identifies the location of the first information block by using a first bit.

In a possible implementation, the processing module is configured to: generate at least two idle blocks at locations of the first information block and the second information block, where the idle block carries an idle block type.

According to a fifth aspect, an embodiment of the present invention provides a network system, including the apparatus in the third aspect and any possible implementation of the third aspect and the apparatus in the fourth aspect and any possible implementation of the fourth aspect.

According to a sixth aspect, an embodiment of the present invention provides a network device, including a processor, a memory, and at least one network interface. The memory is configured to store a computer executable instruction, and when the network device runs, the processor executes the computer executable instruction stored in the memory, so that the network device performs the method in the first aspect and any possible implementation of the first aspect.

According to a seventh aspect, an embodiment of the present invention provides a network device, including a processor, a memory, and at least one network interface. The memory is configured to store a computer executable instruction, and when the network device runs, the processor executes the computer executable instruction stored in the memory, so that the network device performs the method in the second aspect and any possible implementation of the second aspect.

BRIEF DESCRIPTION OF DRAWINGS

To describe the technical solutions in the embodiments of the present invention or in the prior art more clearly, the following briefly describes the accompanying drawings required for describing the background and the embodiments.

FIG. 4 is a schematic structural diagram of a flexible Ethernet data frame according to an embodiment of the present invention;

FIG. 5a is a schematic diagram of an overhead block format of a flexible Ethernet data frame according to an embodiment of the present invention;

FIG. 5b is a schematic diagram of a control block format of a flexible Ethernet data frame according to an embodiment of the present invention;

FIG. 8 is a schematic diagram of idle block distribution according to an embodiment of the present invention;

FIG. 9 is a schematic diagram of BE service distribution according to an embodiment of the present invention;

FIG. 10a is a schematic diagram of a map block format according to an embodiment of the present invention;

FIG. 10b is a schematic diagram of another map block format according to an embodiment of the present invention;

FIG. 11 is another schematic diagram of BE service distribution according to an embodiment of the present invention;

FIG. 12 is a schematic diagram of a mask bit format according to an embodiment of the present invention;

FIG. 13 is a schematic diagram of an overhead block format of a flexible Ethernet data frame according to an embodiment of the present invention;

DESCRIPTION OF EMBODIMENTS

To make the objectives, technical solutions, and advantages of this application clearer and more comprehensible, the following further describes this application in detail with reference to the accompanying drawings and embodiments.

The technical solutions provided in the embodiments of the present invention may be applied to flexible Ethernet, and may also be applied to other types of networks, for example, Ethernet, an optical transport network (OTN) network, and a synchronous digital hierarchy (SDH) network. In the embodiments of the present invention, flexible Ethernet is mainly used as an example for description.

Figure 1:
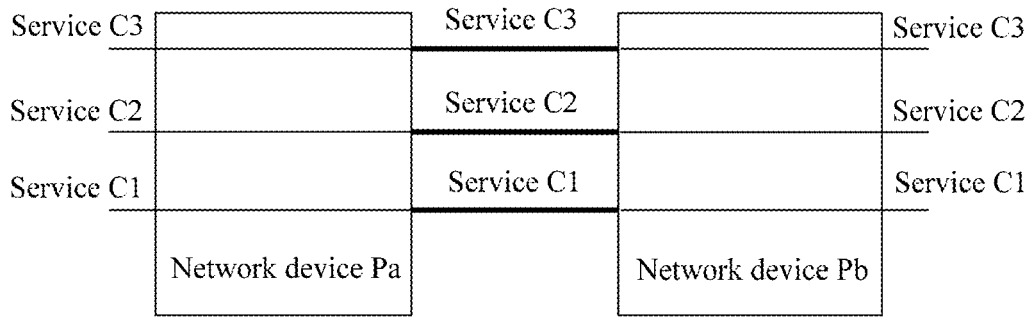
FIG. 1 is a schematic diagram of service transmission of flexible Ethernet in the prior art.
Figure 2:
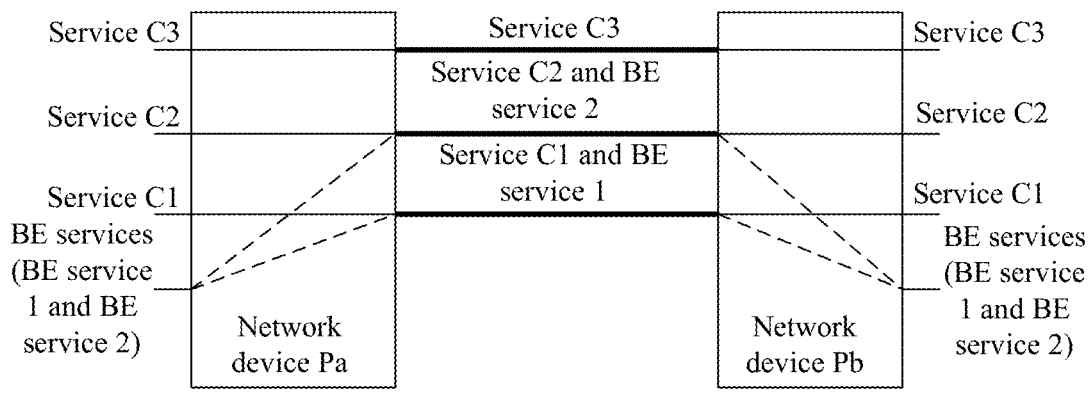
FIG. 2 is a schematic diagram of service transmission of flexible Ethernet according to an embodiment of the present invention.
Figure 3:
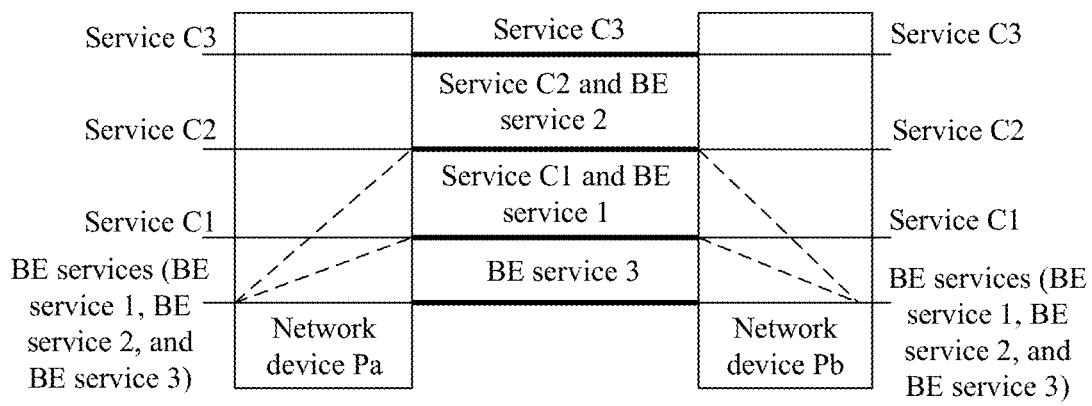
FIG. 3 is a schematic diagram of service transmission of flexible Ethernet according to an embodiment of the present invention.

FIG. 2 is a schematic diagram of service transmission of flexible Ethernet according to an embodiment of the present invention. As shown in FIG. 2, network devices Pa and Pb transmit three services C1, C2, and C3. It is assumed that a physical interface in the network devices Pa and Pb that is used for transmitting the three services is a 100G flexible Ethernet physical interface, and the physical interface is divided into 20 timeslots with a granularity of 5G A bandwidth of the service C1 is 10G and occupies two timeslots: a timeslot 1 and a timeslot 2; a bandwidth of the service C2 is 25G and occupies five timeslots: a timeslot 3 to a timeslot 7; a bandwidth of the service C3 is 25G and occupies five timeslots: a timeslot 8 to a timeslot 12. If the services C1 and C2 are packet services, for example, Ethernet services, the services C1 and C2 may include idle information. The idle information includes no data information of the service, and a timeslot occupied by the idle information is an idle timeslot, causing a waste of timeslot resources. Therefore, in this embodiment of the present invention, the idle timeslot occupied by the idle information of the service may be shared to another service for use, for example, a best effort (Best Effort, BE) service. In FIG. 2, the BE service may be transmitted by using idle timeslots in the service C1 and the service C2. To be specific, a BE service (a BE service 1) and the service C1 share the timeslot 1 and the timeslot 2, and a BE service (a BE service 2) and the service C2 share the timeslot 3 to the timeslot 7. Optionally, as shown in FIG. 3, for BE services, some (a BE service 3) may use exclusive timeslots, for example, a timeslot 13 to a timeslot 20 that are not allocated to another service, and some (the BE service 1 and the BE service 2) use the idle timeslots of the services C1 and C2. The BE service in this embodiment of the present invention may be a flexible Ethernet service, a packet service (for example, an Ethernet service), an Internet Protocol (IP) service, a Fibre Channel (FC) service, an InfiniBand (InfiniBand) service, or the like. The BE service generally has a relatively low priority. When there is a higher-priority service in a network, a transmission bandwidth of the BE service is not necessarily be ensured, but the transmission bandwidth of the BE service can be ensured with the greatest possible effort. Therefore, the BE service may be carried and transmitted by using an idle timeslot or an idle bandwidth of another higher-priority service, to improve network resource utilization.

When a service is transmitted on a flexible Ethernet physical interface, a code block stream with a flexible Ethernet data frame format is formed. For example, a 100G flexible Ethernet physical interface may be divided into 20 timeslots with a granularity of 5G As shown in FIG. 4, a structure of a flexible Ethernet data frame formed on the 100G flexible Ethernet physical interface includes eight rows, with (1+20×1023) code blocks per row. In the data frame structure, one row forms a subframe, eight rows form a basic frame, and 32 rows form a superframe. The code block herein may be a 64B/66B code block. The first code block in each row is an overhead block, and other 20×1023 code blocks are payload blocks. Payload blocks in each row may be divided into 1023 segments by using 20 code blocks as a unit, and 20 code blocks in each segment respectively correspond to 20 timeslots. For example, in each segment, a code block whose identifier is 1 corresponds to a timeslot 1, a code block whose identifier is 2 corresponds to a timeslot 2, . . . , and a code block whose identifier is 20 corresponds to a timeslot 20. An entire flexible Ethernet data frame includes eight rows of payload blocks. Each column of code blocks whose identifiers are 1 corresponds to the timeslot 1, each column of code blocks whose identifiers are 2 corresponds to the timeslot 2, . . . , and each column of code blocks whose identifiers are 20 corresponds to the timeslot 20. In this embodiment of the present invention, a timeslot is a TDM transmission time slice, and may correspond to locations of a plurality of columns of code blocks in one flexible Ethernet data frame, or may correspond to locations of a plurality of columns of code blocks in a plurality of consecutive flexible Ethernet data frames.

The first code block in the first row is the first overhead block of the entire data frame. As shown in FIG. 5a, the overhead block includes a control block type "0x4B" plus "05", which is used to indicate that this location is the first overhead block of the flexible Ethernet data frame.

Block types of a payload block include a control block and a data block, and the control block and the data block may be identified by using the block types. A block type may include a 2-bit synchronization header (Sync Header). "01b" indicates that subsequent eight octets are data characters and that a block type is a data block. "10b" indicates that subsequent characters are control characters and/or data characters and that a block type is a control block. Further, the control block type may be identified by using a control block type field in the control block, and there are 15 control block types in total in the prior art. In this embodiment of the present invention, in terms of idle block identification and processing, an idle block is one type of control block. The idle block carries idle information, and the idle information is actually redundancy information. The idle block is a padding bandwidth for a logical port of a service in a case of relatively low service traffic when a physical interface is exclusive to the service. It may be considered that the logical port includes several timeslots. When the logical port is padded with the idle block, a timeslot corresponding to the idle block is an idle timeslot. The idle block may be identified by using a particular control block type. In a schematic diagram of a code block format shown in FIG. 5b, the first and second bits are the synchronization header "01", indicating that the code block is a control block. Control block types that may be identified by a control block type "0x1E" include an error indication block and an idle block. In the error indication block, the control block type is followed by all "0x1E" compressed into 7 bits. In the idle block, the control block type is followed by all "0x00" compressed into 7 bits.

Figure 6:
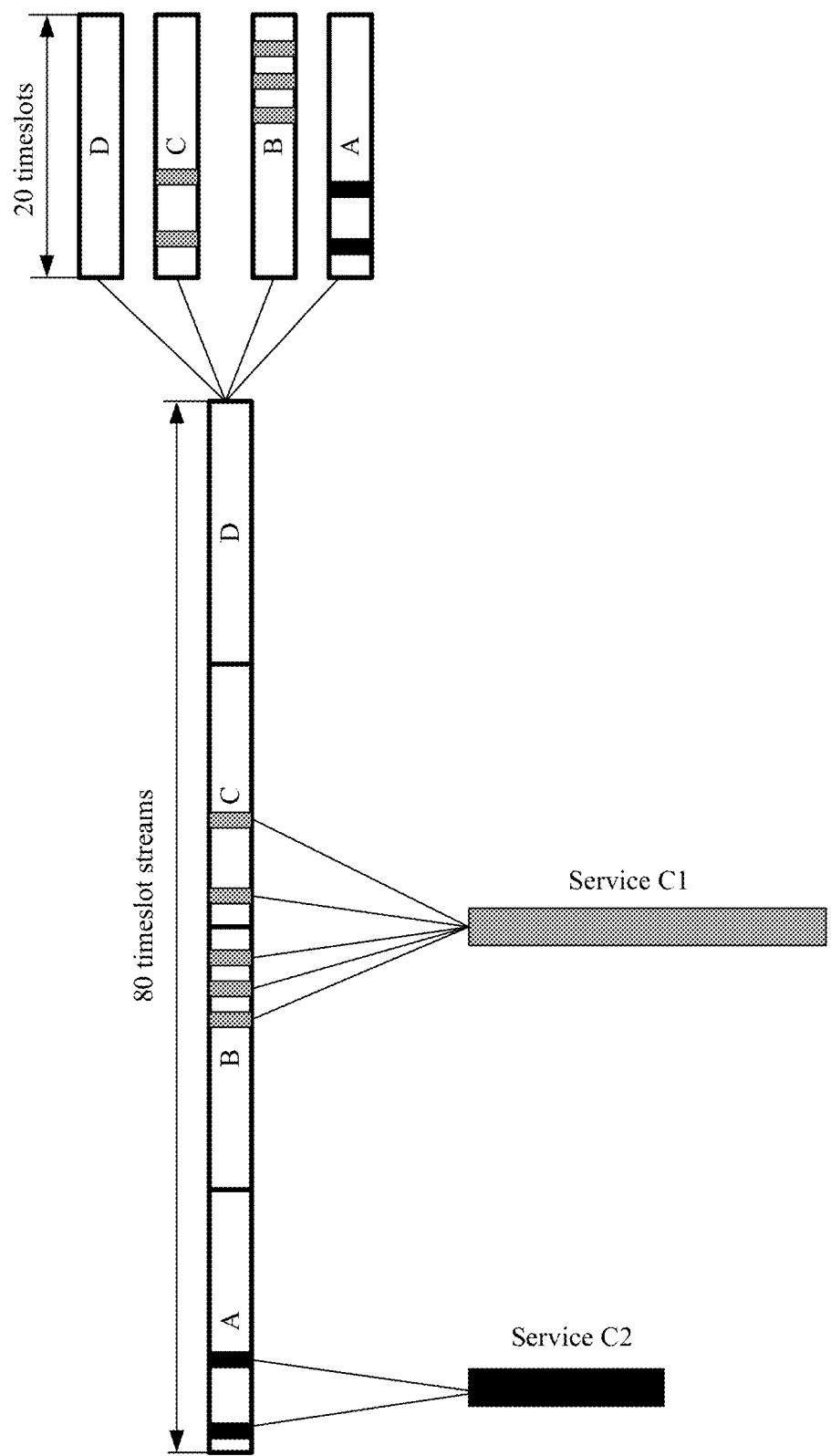
FIG. 6 is a schematic diagram of a service multiplexing process in flexible Ethernet according to an embodiment of the present invention.

In this embodiment of the present invention, that a flexible Ethernet physical interface is used to transmit a service with a flexible Ethernet data frame format is used as an example for description. First, a process of implementing service multiplexing by using the flexible Ethernet physical interface is described. As shown in FIG. 6, two services C1 and C2 are multiplexed on a 400G flexible Ethernet physical interface group formed by cascading four 100GE physical interfaces. The 400G flexible Ethernet physical interface group may be divided into 80 timeslots with a granularity of 5G, and each 100GE physical interface may be divided into 20 timeslots with a granularity of 5G. It is assumed that a bandwidth of the service C1 is 10G and occupies two timeslots, and a bandwidth of the service C2 is 25G and occupies five timeslots. The two services C1 and C2 are distributed to their respective occupied timeslots in the 80 timeslot streams, and then the 80 timeslot streams are separately sent to corresponding physical interfaces in the 400G flexible Ethernet physical interface group. For example, after being distributed to two timeslots that are occupied by the service C1, the service C1 is sent to a flexible Ethernet physical interface A; after being distributed to five timeslots that are occupied by the service C2, the service C2 is sent to flexible Ethernet physical interfaces B and C. That is, the service C1 is transmitted to a physical link by using the physical interface A, and the service C2 is transmitted to a physical link by using the physical interfaces B and C. In this embodiment of the present invention, the method performed by a transmit end network device may be performed during the foregoing service multiplexing process, or may be performed before or after the service multiplexing. Certainly, this embodiment of the present invention may have no association with the foregoing service multiplexing process. The service multiplexing process and this embodiment of the present invention are combined for description, and this is merely used as an example for description.

Figure 7:
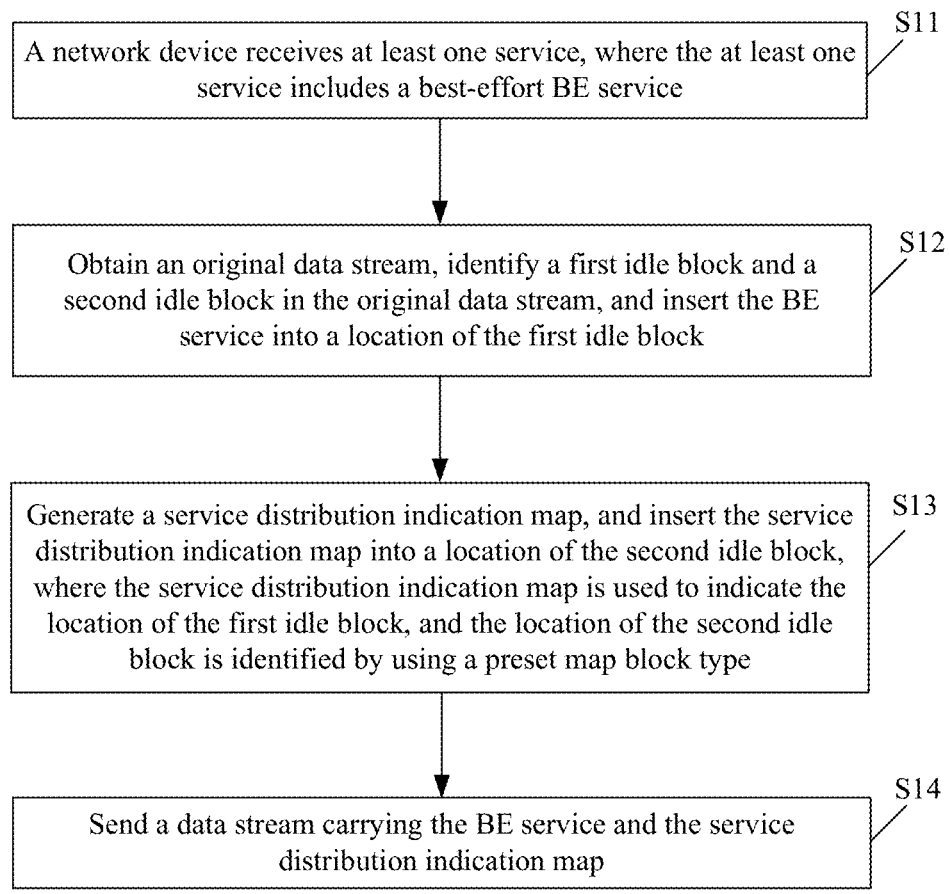
FIG. 7 is an example flowchart of a service sending method according to an embodiment of the present invention.

FIG. 7 is an example flowchart of a service sending method according to an embodiment of the present invention. The method may be performed by a network device such as a flexible Ethernet device or an Ethernet device, and the network device may be a transmit end network device. The method includes the following steps.

S11. The network device receives at least one service, where the at least one service includes a best effort BE service.

The at least one service may include the BE service, and may further include services (for example, the services C1, C2, and C3 in FIG. 2) with exclusive bandwidths. A priority of the service with an exclusive bandwidth is usually higher than that of the BE service, and therefore the network device allocates, based on a bandwidth requirement of a service, bandwidth resources sufficient to carry the service and can ensure that the bandwidth requirement of the service is met. For example, the service with an exclusive bandwidth is an Ethernet service, and the service may include idle information. Because the idle information includes no data information of the service but still needs to occupy a timeslot, idle timeslot resources are caused. In this case, the BE service may be carried and transmitted by using the idle timeslot resources of the service with an exclusive bandwidth. However, because of uncertainty of the idle timeslot resources of the service with an exclusive bandwidth, it is not necessarily be ensured that these idle timeslot resources can meet the bandwidth requirement of the BE service, but a bandwidth can be provided for the BE service with the greatest possible effort. Optionally, the BE service may be transmitted by using a bandwidth released by the service with an exclusive bandwidth. After receiving the BE service, the network device may temporarily store the BE service, and does not perform S12 to S14 on the BE service until the service with an exclusive bandwidth is received.

S12. Obtain an original data stream, identify a first idle block and a second idle block in the original data stream, and insert the BE service into a location of the first idle block.

The original data stream may be obtained by converting the service with an exclusive bandwidth. For example, the network device receives at least one service with an exclusive bandwidth, and converts the at least one service with an exclusive bandwidth into the original data stream. The service with an exclusive bandwidth and the BE service may be received simultaneously, or may be received at different moments.

In an example, this step may be performed during the service multiplexing process shown in FIG. 6. The at least one service in S11 includes the BE service and the service with an exclusive bandwidth. The BE service and the service with an exclusive bandwidth are received at a same moment, or received at different moments. The BE service may be multiplexed simultaneously with the service with an exclusive bandwidth, that is, the technical solution in this embodiment of the present invention is performed simultaneously with the service multiplexing. For the multiplexing process, refer to the embodiment shown in FIG. 6, and details are not described herein again.

In another example, this step may be performed after the service multiplexing shown in FIG. 6. Before performing S12, the network device may receive at least one service with an exclusive bandwidth, and multiplex the at least one service with an exclusive bandwidth, to generate the original data stream. For the multiplexing process, refer to the embodiment shown in FIG. 6, and details are not described herein again. The at least one service with an exclusive bandwidth and the BE service may be received simultaneously or may be received separately.

S13. Generate a service distribution indication map, and insert the service distribution indication map into a location of the second idle block, where the service distribution indication map is used to indicate the location of the first idle block, and the location of the second idle block is identified by using a preset map block type.

An implementation of identifying the first idle block and the second idle block in the original data stream may be: identifying at least two idle blocks in the original data stream, where the at least two idle blocks include the first idle block and the second idle block. The second idle block may be one or more of the at least two idle blocks, and used to carry an idle block distribution indication map and/or the service distribution indication map. The first idle block may be an idle block other than the second idle block, and used to carry the BE service. To be specific, the first idle block is replaced with a code block (referred to as a "BE service block") carrying the BE service, and the second idle block is replaced with a code block (referred to as a "map block") carrying the idle block distribution indication map and/or the service distribution indication map. Alternatively, the first idle block and the second idle block may be code blocks, for example, ERROR blocks, including redundancy information in the original data stream (for example, a data stream formed by the service with an exclusive bandwidth).

The identifying at least two idle blocks in the original data stream may be: obtaining a first segment data stream from the original data stream, and identifying idle blocks in the first segment data stream to obtain at least two idle blocks, where the idle block carries an idle block type. After the identifying at least two idle blocks in the original data stream, the method may further include: generating the idle block distribution indication map, where the idle block distribution indication map is used to indicate locations of the at least two idle blocks and/or a location of a non-idle block.

The original data stream includes an idle block "/I/" and a non-idle block "D/C". The original data stream may be an encoded data stream, or may be an unencoded data stream. The encoded data stream may be in a 64B/66B encoding format, or may be in an 8B/10B encoding format, a 512B/514B encoding format, or the like. An idle block in a data stream may be identified based on a specific data stream format, and that the data stream is in a 64B/66B encoding format is used as an example for description in this embodiment of the present invention. For example, referring to FIG. 5b, the idle block "/I/" in the data stream may be identified by using an idle block type such as a synchronization header (10) or a control block type (0x1E), and at least one 0x00 following the control block type.

A specific example is used below for description. For example, a data stream obtained after service multiplexing may be detected. In FIG. 6, for an original data stream sent on each physical interface in a 400G flexible Ethernet physical interface, starting from the first code block after the first overhead block, 20 consecutive code blocks are successively selected as a segment data stream with reference to the flexible Ethernet data frame format, forming an idle block distribution diagram shown in FIG. 8. The foregoing first segment data stream may be a segment data stream formed by the consecutive 20 code blocks in the original data stream. Because the flexible Ethernet data frame format may be divided into 20 timeslots, selecting 20 code blocks may exactly correspond to the 20 timeslots. As shown in FIG. 8, there are 20 code blocks in each row, and the 20 code blocks may be all non-idle blocks "D/C", or may be all idle blocks "/I/", or may be a combination of idle blocks and non-idle blocks. FIG. 8 shows an example of distribution of some idle blocks, and actually there may be more distribution cases.

In FIG. 8, the idle block distribution indication map may use 20 bits to indicate location distribution of idle blocks and non-idle blocks in the corresponding 20 code blocks. The idle block distribution indication map may indicate location distribution and a quantity of idle blocks, and may also indicate location distribution and a quantity of non-idle blocks. The idle block distribution indication map includes a first bit and a second bit, the first bit indicates an idle block, and the second bit indicates a non-idle block. For example, in FIG. 8, a bit "0" indicates an idle block, and a bit "1" indicates a non-idle block. Optionally, in the idle block distribution indication map, a code block may also be indicated by using two or more bits. For example, "00" indicates an idle block, and "01" indicates a non-idle block.

As shown in FIG. 9, 20 code blocks in an original data stream are selected as a segment data stream, and among segment data streams, some include no idle block, some include one idle block, or some include more than two idle blocks. When a segment data stream includes at least two idle blocks, an idle block distribution indication map and/or a service distribution indication map may be inserted into a location of one idle block (a second idle block), to form a map block. A BE service is inserted into a location of a remaining idle block (a first idle block), to form a BE service block. For a segment data stream including only one idle block or including no idle block, the segment data stream may not be used to carry the BE service, and may either not be needed to carry the idle block distribution indication map and/or the service distribution indication map, for example, an unused idle block "/I/" in FIG. 9. The service distribution indication map may indicate the location of the first idle block, that is, a location of the BE service block. The idle block distribution indication map may indicate locations of idle blocks, including locations of the first idle block and the second idle block. The service distribution indication map may be generated from the idle block distribution indication map. Quantities of bits and values of bits that are included in the service distribution indication map and the idle block distribution indication map may be the same. Generation of the service distribution indication map may be performed when the BE service is inserted, or may be performed after the BE service is inserted. This is not limited in the present invention.

The "location" in this embodiment of the present invention is a relative location. A relative location between two blocks (for example, two idle blocks) may keep unchanged. For example, in the first row of segment data stream, the first idle block and the second idle block are separated by eight non-idle blocks. During a data transmission process, a relative location between the two idle blocks may keep unchanged. The location of the second idle block is identified by using the preset map block type. As shown in FIG. 10a, a map block type may include a synchronization header "10", a control block type "4B", and "0xA". Three octets D1, D2, and D3, that is, 24 bits in total are used, from which 20 bits may be randomly selected to carry the service distribution indication map and/or the idle block distribution indication map. It should be noted that the map block type may be identified in another manner, provided that the identification manner differs from 15 control block types in 64B/66B encoding in the prior art and meets a constraint requirement defined by a code block type of a physical interface. For example, as shown in FIG. 10b, a new control block type "0x00" is defined in this embodiment of the present invention. Seven octets D0 to D6, that is, 56 bits in total may be used to carry the service distribution indication map and/or the idle block distribution indication map.

The identifying a first idle block and a second idle block in the original data stream may further include: obtaining a second segment data stream from the original data stream, and identifying at least two idle blocks in the second segment data stream, where the at least two idle blocks include the first idle block and the second idle block; and identifying a location of the second segment data stream by using preset participation information.

Optionally, some timeslots may be pre-specified as timeslots (briefly referred to as "nonparticipating timeslots" below) that do not participate in idle block (including the first idle block and the second idle block) identification. As shown in FIG. 11, a timeslot 3 and a timeslot 4 are specified nonparticipating timeslots, and it may be unnecessary to identify whether code blocks corresponding to the two timeslots are idle blocks. Idle blocks "/I/" included in two columns of code blocks corresponding to the two timeslots are unused idle blocks, that is, the idle blocks corresponding to the nonparticipating timeslots do not carry the idle block distribution indication map and/or the service distribution indication map, and do not carry the BE service either.

In an example, the preset participation information may be indicated in the service distribution indication map. For example, "00" indicates a first idle block, "01" indicates a non-idle block, and "10" indicates an idle block corresponding to a nonparticipating timeslot. The preset participation information may alternatively be carried in the idle block distribution indication map. For example, "00" indicates a first idle block and a second idle block, "01" indicates a non-idle block, and "10" indicates an idle block corresponding to a nonparticipating timeslot.

In another example, the preset participation information may also be represented by using the idle block distribution indication map obtained after a mask operation. Optionally, a mask operation may further be performed on the service distribution indication map by using a similar principle. For example, a transmit end device uses the location of the second idle block to carry the idle block distribution indication map, and a receive end device performs a mask operation on the idle block distribution indication map by using mask bits shown in FIG. 12. For example, FIG. 12 shows a 20-bit mask bit sequence, in which the third and fourth bits are both "1", indicating nonparticipating timeslots, and other bits are all "0", indicating participating timeslots. An "OR" mask operation is performed by using the 20 mask bits and the idle block distribution indication map (1 identifies a non-idle block, and 0 identifies an idle block) of a segment data stream including 20 code blocks, so that the third and fourth bits of the idle block distribution indication map may be set to 1 when the third and fourth bits are not 0. To be specific, neither the BE service nor the service distribution indication map or the idle block distribution indication map can be inserted at locations of code blocks corresponding to the two bits.

Optionally, a mask bit may be directly transmitted as the preset participation information. As shown in Table 1, a nonparticipating timeslot may be indicated by a bit "0", and a participating timeslot is indicated by a bit "1". Alternatively, a nonparticipating timeslot is indicated by a bit "1", and a participating timeslot is indicated by a bit "0".

TABLE 1

| Timeslot number | Nonparticipating timeslot or not | A bit "0" indicates a nonparticipating timeslot | A bit "1" indicates a nonparticipating timeslot |
|---|---|---|---|
| 1 | No | 1 | 0 |
| 2 | No | 1 | 0 |

TABLE 1-continued

| Timeslot number | Nonparticipating timeslot or not | A bit "0" indicates a nonparticipating timeslot | A bit "1" indicates a nonparticipating timeslot |
|---|---|---|---|
| 3 | Yes | 0 | 1 |
| 4 | Yes | 0 | 1 |
| 5 | No | 1 | 0 |
| 6 | No | 1 | 0 |
| 7 | No | 1 | 0 |
| 8 | No | 1 | 0 |
| 9 | No | 1 | 0 |
| 10 | No | 1 | 0 |
| 11 | No | 1 | 0 |
| 12 | No | 1 | 0 |
| 13 | No | 1 | 0 |
| 14 | No | 1 | 0 |
| 15 | No | 1 | 0 |
| 16 | No | 1 | 0 |
| 17 | No | 1 | 0 |
| 18 | No | 1 | 0 |
| 19 | No | 1 | 0 |
| 20 | No | 1 | 0 |

A transmission frequency of the nonparticipating timeslot may be different in different application scenarios:

If the nonparticipating timeslot is statically configured, that is, the nonparticipating timeslot is constant, the preset participation information may not need to be transmitted in real time. The preset participation information may be directly configured on the transmit end network device and a receive end network device, for example, through network management. Alternatively, the preset participation information may be carried by using an overhead block of a flexible Ethernet data frame before service transmission starts.

If the nonparticipating timeslot is dynamically configured, that is, the nonparticipating timeslot changes in real time, the preset participation information should be carried in a data stream for real-time transmission. The preset participation information may be carried by using a map block. For example, masking may be performed in the service distribution indication map, or a mask bit may be directly transmitted.

If the nonparticipating timeslot is semi-dynamically configured, that is, the nonparticipating timeslot is constant within a period of time, the preset participation information may be transmitted periodically. For example, when frame boundaries of the nonparticipating timeslot in flexible Ethernet change, and timeslots 3 and 4 change into timeslots 5 and 6, the preset participation information may be carried in an overhead block of a flexible Ethernet data frame. It may be learned from FIG. 4 that an overhead block occurs every 1023×20 code blocks. As shown in FIG. 13, a reserved (Reserved) field of the second overhead block and/or the third overhead block of the flexible Ethernet data frame may be used to carry the preset participation information such as a mask bit.

In the foregoing application scenarios, the preset participation information may be a mask bit, or may be indicated by using the idle block distribution indication map or the service distribution indication map that is obtained after a mask operation. For example, in FIG. 10*a*, in addition to D1, D2, and D3, 28 reserved bits may be used. In the idle block distribution indication map or the service distribution indication map, an idle block corresponding to a nonparticipating timeslot is indicated by using "10" or a mask operation; alternatively, the mask bit is carried by using a reserved bit, or the like.

Optionally, timeslots that participate in idle block identification ("participating timeslots" for short) may be pre-specified. For example, timeslots other than the timeslots 3 and 4 are specified in FIG. 11. An implementation principle is similar, and details are not described herein again.

Optionally, some or all of the nonparticipating timeslots may be allocated to the BE service as exclusive timeslots, and the exclusive timeslots are a basic assured bandwidth of the BE service. An actual bandwidth of the BE service may exceed the basic assured bandwidth, that is, the BE service may further occupy an idle timeslot resource of another service. When being inserted into the location of the first idle block and/or a code block location corresponding to the basic assured bandwidth, the BE service may be inserted into a segment data stream in a left-to-right order.

Figure 14:
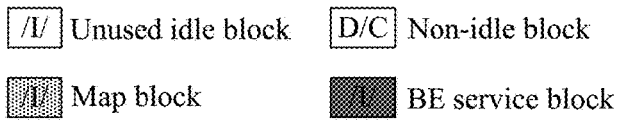
FIG. 14 is a schematic diagram of data stream rearrangement according to an embodiment of the present invention.
Figure 15:
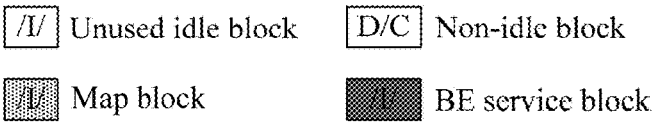
FIG. 15 is another schematic diagram of data stream rearrangement according to an embodiment of the present invention.

The location of the second idle block (or the map block) is adjusted to a first location in the first segment data stream or the second segment data stream. To enable the receive end network device to fast obtain the BE service, the segment data stream into which the BE service is inserted may further be rearranged. Optionally, the segment data stream may be first rearranged, and then the BE service is inserted into the segment data stream. In an example, as shown in FIG. 14, the second idle block (or the map block) is placed at the first location, and then the non-idle block and the first idle block (or the BE service block) are placed successively. Alternatively, the first idle block (or the BE service block) may be first placed, and then the non-idle block is placed. Segment data streams that are not used to carry the BE service, for example, segment data streams in the third and fourth rows may not be rearranged. In another example, as shown in FIG. 15, locations of the first code block and the second idle block may be exchanged, so that the second idle block (or the map block) regularly occurs at the first location. Optionally, the second idle block (or the map block) may be placed at another fixed location.

S14. Send a data stream carrying the BE service and the service distribution indication map.

In this embodiment of the present invention, optionally, in S12, starting from the first code block after the first overhead block of the flexible Ethernet data frame, 40 consecutive code blocks may be successively selected as a segment data stream on each physical interface in the 400G flexible Ethernet physical interface group. Optionally, starting from the first code block after the first overhead block, 50 consecutive code blocks may be successively selected as a segment data stream on a 100G flexible Ethernet physical interface. Optionally, 5 code blocks, 10 code blocks, or the like may be consecutively selected as a segment data stream. This is not limited in the present invention.

Referring to FIG. 10a, D1, D2, and D3 have 24 bits in total, plus 28 reserved bits, and there are 52 bits in total, which can carry a 40-bit service distribution indication map and/or idle block distribution indication map. When there are more than 52 code blocks in the segment data stream, at least two code blocks may be used to carry the service distribution indication map and/or the idle block distribution indication map. The map block shown in FIG. 10b may carry a 56-bit service distribution indication map and/or idle block distribution indication map. When there are more than 56 code blocks in the segment data stream, at least two code blocks may be used to carry the service distribution indication map and/or the idle block distribution indication map. Optionally, a data code block whose synchronization header is "01" may be used to carry the service distribution indication map and/or the idle block distribution indication map.

When at least two code blocks are used to carry the service distribution indication map and/or the idle block distribution indication map, a pointer field may be used to indicate locations of one or more map blocks. For example, in FIG. 16a, a MapEx field is added to the first map block in at least two map blocks, and is used to identify locations of map blocks other than the first map block. A map block type including a control block type "4B" and "0xA" is used to identify the first map block. MapEx may be a pointer and used to indicate locations of other map blocks. Alternatively, a location of a second map block may be indicated by using MapEx of the first map block, a location of a third map block is indicated by using MapEx of the second map block, and so on. Optionally, another map block type, for example, a control block type "0x00" may be used to identify the first map block; or a segment length indication field L Indicator may be added and used to identify a length L of a segment data stream, for example, 80. Optionally, all map blocks may be directly identified by using a map block type without using a MapEx pointer.

If a length of the segment data stream is L, relative to a boundary location of a flexible Ethernet data frame, a boundary location of the segment data stream may be uncertain. For example, when L is 50, relative to a subframe with a length of 20×1023 code blocks, a basic frame with a length of 20×1023 ×8 code blocks, and a superframe with a length of 20×1023×8×32 code blocks, boundaries of the segment data stream have a boundary location alignment problem. That is, a location of the first code block in the first segment data stream in a flexible Ethernet frame may be at the $(pi)^{th}$ code block of the flexible Ethernet frame, where L≥pi≥1. Therefore, a segment boundary pointer pi may need to be added to overheads of the flexible Ethernet. For example, a 6-bit boundary pointer field (0 to 63) is defined in the overheads of the flexible Ethernet data frame, to indicate a start location of the first segment data stream in a current frame.

Optionally, in flexible Ethernet, a plurality of physical interfaces are cascaded to form a physical interface group, and segment data streams may be obtained in parallel on the plurality of physical interfaces. For example, in a flexible Ethernet physical interface group formed by cascading n physical interfaces, k code blocks are selected on each physical interface, and a length of a segment data stream is L=n×k. For example, if there are four 100G physical interfaces, and 20 code blocks are selected on each interface, n=4, k=20, and n×k=80. It should be noted that a larger value of n×k indicates a higher probability of existence of more than two idle blocks, that is, a higher probability that a BE service can be inserted. The segment data streams are obtained in parallel on the plurality of physical interfaces, and this helps improve bandwidth utilization efficiency and reduce a processing delay. Segment boundaries of the segment data stream may be determined with reference to boundaries of the flexible Ethernet data frame, that is, the first overhead block of the flexible Ethernet data frame.

In this embodiment of the present invention, the network device obtains at least two data streams, where the at least two data streams include a first data stream and a second data stream; the first data stream is inserted into the second data stream, to generate a third data stream, where the third data stream includes a first information block and a second information block, the first information block and the second information block are generated from the second data stream, the first information block is used to carry the first data stream, and the second information block is used to carry a first data stream distribution indication map, the first data stream distribution indication map is used to indicate a location of the first information block, and the second information block is identified by using a preset map block type; and the third data stream is sent. The technical solution in this embodiment of the present invention may be implemented by using the method procedure shown in FIG. 7. For example, the first data stream may be a data stream formed by a BE service, and the second data stream may be an original data stream formed by a service with an exclusive bandwidth. The first information block may be a BE service block, and the second information block may be a map block. The first data stream distribution indication map may be an idle block distribution indication map and/or a service distribution indication map. However, the implementation of this embodiment of the present invention is not limited to the method procedure shown in FIG. 7. For example, in S12, an idle block may not need to be identified, but a location at which the idle block needs to be generated is determined during a process in which the service with an exclusive bandwidth forms the original data stream, and the BE service and the service distribution indication map are inserted into the location at which the idle block needs to be generated.

In this embodiment of the present invention, the BE service is carried by using an idle block or a redundancy information block of the service with an exclusive bandwidth, so that idle timeslots of the service with an exclusive bandwidth are fully utilized, thereby improving bandwidth utilization and implementing statistical multiplexing of a service in flexible Ethernet.

Figures 16A, 16B, 17:
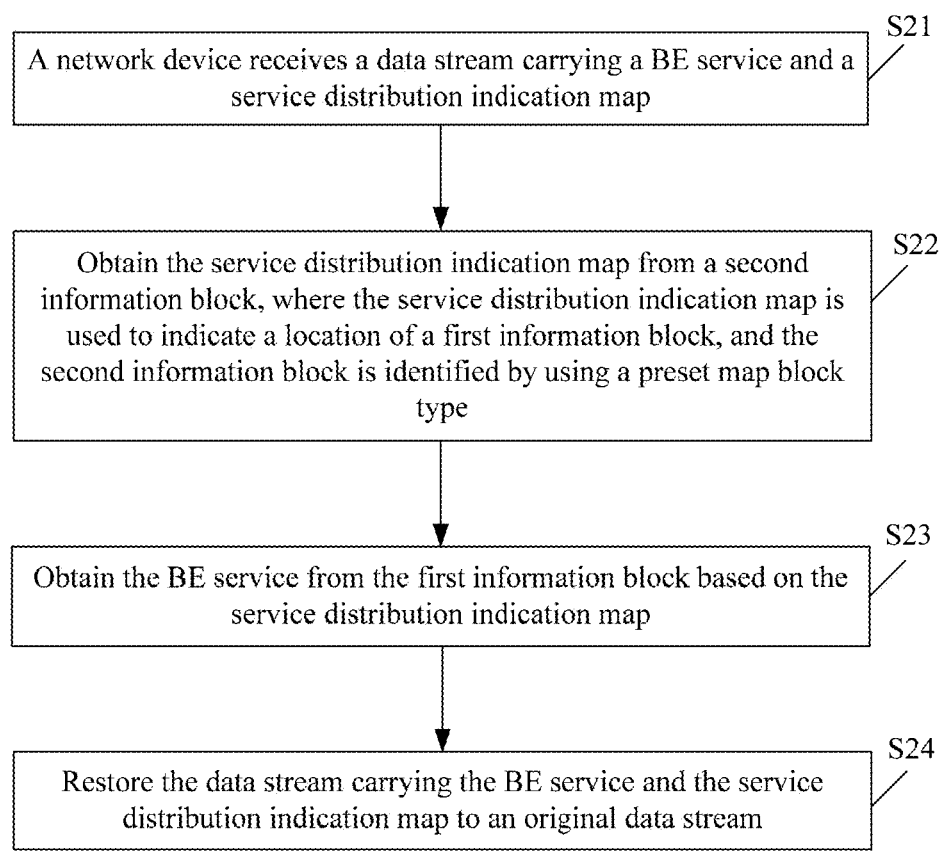
FIG. 16a is a schematic diagram of a map block format according to an embodiment of the present invention.
FIG. 16b is a schematic diagram of another map block format according to an embodiment of the present invention.
FIG. 17 is an example flowchart of a service receiving method according to an embodiment of the present invention.

FIG. 17 is an example flowchart of a service receiving method according to an embodiment of the present invention. The method may be performed by a network device such as a flexible Ethernet device or an Ethernet device, and the network device may be a receive end network device. In this embodiment of the present invention, the method performed by the receive end network device may be performed during a service demultiplexing process, or may be performed before or after the service demultiplexing. The service demultiplexing process and the multiplexing process shown in FIG. 6 are mutually inverse, and details are not described herein again. Certainly, a solution in this embodiment of the present invention may have no association with the service demultiplexing process. The service demultiplexing process and this embodiment of the present invention are combined below for description, and this is merely used as an example for description. The method includes the following steps.

S21. The network device receives a data stream carrying a BE service and a service distribution indication map.

The data stream carrying the BE service and the service distribution indication map may further carry a service with an exclusive bandwidth. The BE service may be carried by using an idle timeslot of the service with an exclusive bandwidth. For how to carry the BE service by using the idle timeslot of the service with an exclusive bandwidth, refer to the embodiment shown in FIG. 7.

S22. Obtain the service distribution indication map from a second information block, where the service distribution indication map is used to indicate a location of a first information block, and the second information block is identified by using a preset map block type.

In an example, this step may be performed during the service demultiplexing process. That is, the technical solution of the present invention is executed simultaneously when a received data stream is demultiplexed.

In another example, this step may be performed before the service demultiplexing. That is, the BE service is first extracted from the received data stream, and then the service with an exclusive bandwidth is demultiplexed.

The first information block may be a BE service block carrying the BE service, and the second information block may be a map block carrying the service distribution indication map. An implementation of obtaining the service distribution indication map from the second information block may include: obtaining a first segment data stream from the data stream carrying the BE service and the service distribution indication map; identifying a map block type in the first segment data stream; and obtaining the service distribution indication map from the second information block identified by the map block type.

It should be noted that a length of the first segment data stream may be the same as or may be different from that selected by a transmit end network device. For the map block type and a manner of obtaining the service distribution indication map from the map block, refer to the embodiment shown in FIG. 10a and FIG. 10B, and details are not described herein again.

Optionally, the network device may further obtain preset participation information, and obtain, based on the preset participation information, a second segment data stream from the data stream carrying the BE service and the service distribution indication map. The preset participation information indicates a location of the second segment data stream. If the transmit end network device specifies, in the first segment data stream, some timeslots (nonparticipating timeslots) that do not participate in idle block identification, the receive end network device needs to obtain the preset participation information according to a specified rule of the transmit end network device, and obtain the service distribution indication map and the BE service from the second segment data stream (a participating timeslot) based on the preset participation information. For the rule in which the transmit end network device specifies the nonparticipating timeslots, refer to the embodiment shown in FIG. 11, FIG. 12, and FIG. 13, and details are not described herein again.

The obtaining the service distribution indication map from the second information block includes: obtaining the service distribution indication map from a first location in the first segment data stream or the second segment data stream. If the transmit end network device rearranges a segment data stream (refer to the embodiment shown in FIG. 14 and FIG. 15), the receive end network device may obtain the service distribution indication map from a preset first location in the first segment data stream or the second segment data stream according to the transmit end rearrangement rule.

The service distribution indication map identifies the location of the first information block by using a first bit. For example, as shown in FIG. 9, the location of the first information block into which the BE service is inserted is identified by using a bit "0".

S23. Obtain the BE service from the first information block based on the service distribution indication map.

The service distribution indication map can indicate a location of the BE service, for example, by using the bit "0". If the service distribution indication map indicates the location of the first information block and the location of the second information block by using a same bit (for example, "0"), the second information block is first identified based on a map block type, the service distribution indication map is obtained from the second information block, and the location of the second information block is excluded from the service distribution indication map to obtain the location of the first information block.

S24. Restore the data stream carrying the BE service and the service distribution indication map to an original data stream.

In this embodiment of the present invention, at least two idle blocks are generated at locations of the first information block and the second information block, and the idle block carries an idle block type. After the service distribution indication map is extracted from the second information block, and the BE service is to be extracted from the first information block, idle blocks may be separately generated at the locations of the second information block and the first information block. Because the BE service is transmitted by using the idle timeslot (a location of the idle block) of the service with an exclusive bandwidth, the BE service block and the map block are restored to the original idle block, that is, the original data stream only carrying the service with an exclusive bandwidth is restored. For a field format of the idle block, refer to the embodiment shown in FIG. 5b.

In this embodiment of the present invention, the network device receives a third data stream, extracts a first data stream from the third data stream, and restores the third data stream to a second data stream. The third data stream includes the first information block and the second information block, and the second data stream is restored by using the first information block and the second information block. The first information block is used to carry the first data stream, and the second information block is used to carry a first data stream distribution indication map. The first data stream distribution indication map is used to indicate the location of the first information block, and the second information block is identified by using the preset map block type. The technical solution in this embodiment of the present invention may be implemented by using the method procedure shown in FIG. 17. For example, the third data stream may be the data stream carrying the BE service and the service distribution indication map, the first data stream may be a data stream formed by a BE service, and the second data stream may be an original data stream formed by a service with an exclusive bandwidth. The first information block may be a BE service block, the second information block may be a map block, and the first data stream distribution indication map may be a service distribution indication map. However, the implementation of this embodiment of the present invention is not limited to the method procedure shown in FIG. 17. For example, in S21, the BE service and the service distribution indication map may be received from different data streams.

In this embodiment of the present invention, the BE service is carried by using an idle block or a redundancy information block of the service with an exclusive bandwidth, and the BE service is extracted from the service with an exclusive bandwidth, so that idle timeslots of the service with an exclusive bandwidth are fully utilized, thereby improving bandwidth utilization and implementing statistical multiplexing of a service in flexible Ethernet.

In addition to being applied to flexible Ethernet, the technical solution provided in this embodiment of the present invention may be applied to another type of network, for example, Ethernet, an OTN, or an SDH. Currently, in flexible Ethernet, the data stream is encoded through 64B/66B encoding. Actually, an octet byte group in an unencoded data stream or a decoded data stream may correspond to a 64B/66B code block. For example, on an MII (Media Independent Inteface, media independent interface) inter-face of Ethernet, MII interface data may be an unencoded or a decoded character. Depending on different interface rates, the MII interface may be a 1 Gbps media independent interface (1000 Mbps Media Independent Inteface, GMII), 10 Gbps media independent interface (10 Gbps Media Independent Inteface, XGMII), 40 Gbps media independent interface (40 Gbps Media Independent Inteface, XLGMII), 100 Gbps media independent interface (100 Gbps Media Independent Inteface, CGMII), 400 Gbps media independent interface (400 Gbps Media Independent Inteface, CDG-MII), or the like. As shown in Table 2, the first two columns are MII interface data characters, including transmit (character) control (signals) (Transmit (character) Control (signals), TXC)/received (character) control (signals) (Received (character) Control (signals), RXC), and transmit (character) data (Transmit (character) Data, TXD)/received (character) data (Received (character) Data, RXD). Each pair of <TXC, TXD> or <RXC, RXD> may correspond to a block type of 64B/66B encoding. For example, when TXC/RXC is "0b1" and TXD/RXD is "0x07", a corresponding block is an idle block. During 64B/66B encoding, "0x07" of TXD/RXD is compressed into 7-bit "0x00".

TABLE 2

| TXC/RXC 1-bit binary value | TXD/RXD 8-bit hexadecimal value | Notation | Descriptions of MII interface data characters |
|---|---|---|---|
| 0b0 | 0x00 to 0xFF | /D/, D | Data octets in a packet, and user transparent data information 0x00 to 0xFF |
| 0b1 | 0x00 to 0x05 | — | Reserved and unused, having no definite meaning |
| 0b1 | 0x06 | /LI/ | LPI, optional Low Power Idle indication, to make an interface have a low-power mode signal |
| 0b1 | 0x07 | /I/, I | Idle character octets with a normal interframe space |
| 0b1 | 0x08 to 0x9B | — | Reserved and unused, having no definite meaning |
| 0b1 | 0x9C | /O/, O | Link status indication control character octet in an interframe space, and subsequent three octets, used to indicate a specific meaning, for example, a local error, or a remote error |
| 0b1 | 0x9D to 0xFA | — | Reserved and unused, having no definite meaning |
| 0b1 | 0xFB | /S/, S | Start-of-frame character, used to replace a first octet of a preamble |
| 0b1 | 0xFC | — | Reserved and unused, having no definite meaning |
| 0b1 | 0xFD | /T/, T | End-of-frame character, the first idle control character inserted after an end of a frame |
| 0b1 | 0xFE | /E/, E | Error character, indicating that an error occurs |
| 0b1 | 0xFF | — | Reserved and unused, having no definite meaning |

A plurality of reserved characters (gray areas) exist in Table 2, and any reserved character may be selected to carry the service distribution indication map and/or an idle block distribution indication map. For example, as shown in FIG. 3, the MII interface data character <TXC, TXD> or <RXC, RXD> may be set to <0b1, 0xFF>, to establish a mapping relationship with a map block in a 64B/66B encoding format. Therefore, the technical solution in this embodiment of the present invention may further be implemented based on an unencoded character such as the MII interface data character. Certainly, this embodiment of the present invention may be compatible with other encoding formats such as 8B/10B encoding and 512B/514b encoding.

TABLE 3

| MII interface data: <TXC0, TXD0>, <TXC1, TXD1>, <TXC2, TXD2>,<TXC3, TXD3>, <TXC4, TXD4>, <TXC5, TXD5>, <TXC6, TXD6>, <TXC7, TXD7> or <RXC0, RXD0>, <RXC1, RXD1>, <RXC2, RXD2>,<RXC3, RXD3>, <RXC4, RXD4>, <RXC5, RXD5>, <RXC6, RXD6>, <RXC7, RXD7> | Map block in a 64B/66B encoding format |
|---|---|
| <1, 0xFF><0, D1><0, D2><0, D3><0, 0x00><0, 0x00><0, 0x00><0, 0x00> | 0x4B, D1, D2, D3, 0xA, 0x000_0000 |
| <1, 0xFF><0, D1><0, D2><0, D3><0, D4><0, D5><0, D6><0, 0x00> | 0x4B, D1, D2, D3, 0xA0, D4, D5, D6 |
| <1, 0xFF><0, D1><0, D2><0, D3><0, D4><0, D5><0, D6><0, D7> | 0x00, D1, D2, D3, D4, D5, D6, D7 |
| <1, 0xFF><0, D1><0, D2><0, D3><0, D4><0, D5><0, D6><0, 0x00> | 0x78, D1, D2, D3, D4, D5, D6, 0x00 |

Figure 18:
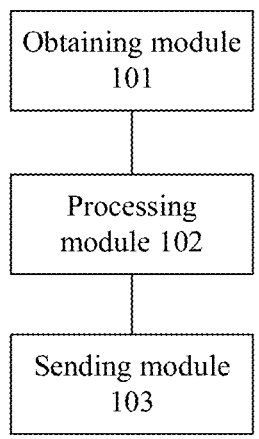
FIG. 18 is a schematic structural diagram of a service sending apparatus according to an embodiment of the present invention.

FIG. 18 is a schematic structural diagram of a service sending apparatus according to an embodiment of the present invention. The apparatus may be a flexible Ethernet device, an Ethernet device, an OTN device, an SDH device, or the like. As shown in FIG. 18, the apparatus may include an obtaining module 101, a processing module 102, and a sending module 103. In this embodiment of the present invention, the functional modules are divided logically, but a division manner is not limited. For example, each module may be an independent circuit module, or may be integrated into a circuit module. Each module may be implemented in a form of an integrated circuit such as a chip. The service sending apparatus in this embodiment of the present invention may perform the method steps in the embodiment shown in FIG. 7.

The obtaining module 101 is configured to obtain at least two data streams, where the at least two data streams include a first data stream and a second data stream.

The processing module 102 is configured to insert the first data stream into the second data stream, to generate a third data stream.

The third data stream includes a first information block and a second information block, and the first information block and the second information block are generated from the second data stream.

The first information block is used to carry the first data stream, the second information block is used to carry a first data stream distribution indication map, the first data stream distribution indication map is used to indicate a location of the first information block, and the second information block is identified by using a preset map block type.

The sending module 103 is configured to send the third data stream.

In this embodiment of the present invention, a BE service is carried by using an idle block or a redundancy information block of a service with an exclusive bandwidth, so that idle timeslots of the service with an exclusive bandwidth are fully utilized, thereby improving bandwidth utilization and implementing statistical multiplexing of a service in flexible Ethernet.

Figure 19:
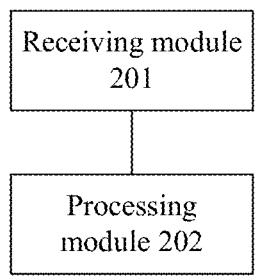
FIG. 19 is a schematic structural diagram of a service receiving apparatus according to an embodiment of the present invention.

FIG. 19 is a schematic structural diagram of a service receiving apparatus according to an embodiment of the present invention. The apparatus may be a flexible Ethernet device, an Ethernet device, an OTN device, an SDH device, or the like. As shown in FIG. 19, the apparatus may include a receiving module 201 and a processing module 202. In this embodiment of the present invention, the functional modules are divided logically, but a division manner is not limited. For example, each module may be an independent circuit module, or may be integrated into a circuit module. Each module may be implemented in a form of an integrated circuit such as a chip. The service sending apparatus in this embodiment of the present invention may perform the method steps in the embodiment shown in FIG. 17.

The receiving module 201 is configured to receive a third data stream.

The processing module 202 is configured to: extract a first data stream from the third data stream, and restore the third data stream to a second data stream.

The third data stream includes a first information block and a second information block, and the second data stream is restored by using the first information block and the second information block.

The first information block is used to carry the first data stream, the second information block is used to carry a first data stream distribution indication map, the first data stream distribution indication map is used to indicate a location of the first information block, and the second information block is identified by using a preset map block type.

In this embodiment of the present invention, a BE service is carried by using an idle block or a redundancy information block of a service with an exclusive bandwidth, and the BE service is extracted from the service with an exclusive bandwidth, so that idle timeslots of the service with an exclusive bandwidth are fully utilized, thereby improving bandwidth utilization and implementing statistical multiplexing of a service in flexible Ethernet.

Figure 20:
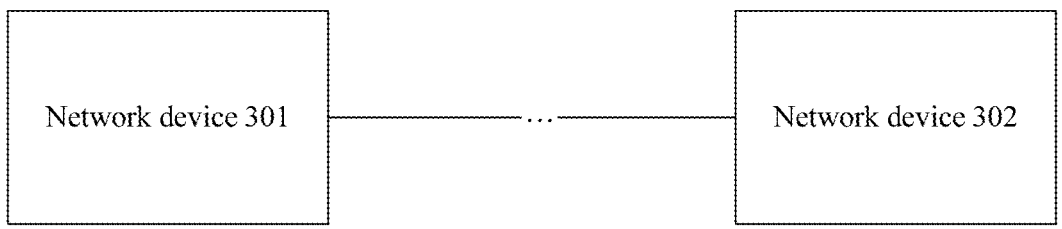
FIG. 20 is a schematic structural diagram of a network system according to an embodiment of the present invention.

FIG. 20 is a schematic structural diagram of a network system according to an embodiment of the present invention. The network system may be flexible Ethernet, Ethernet, an OTN, an SDH network, or the like. As shown in FIG. 20, the network system may include at least two network devices, for example, a network device 301 and a network device 302. Each network device may be a transmit end network device or a receive end network device, and may have the structure shown in FIG. 18 and/or FIG. 19.

Figure 21:
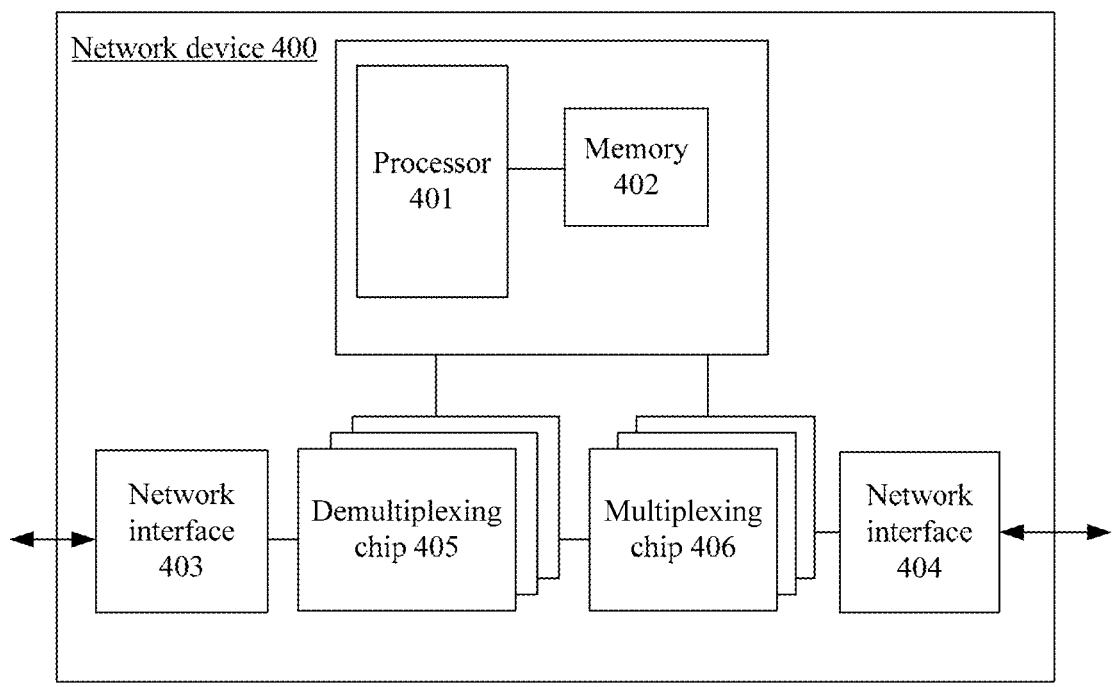
FIG. 21 is a schematic structural diagram of a network device according to an embodiment of the present invention.

FIG. 21 is a schematic structural diagram of a network device according to an embodiment of the present invention. The network device may be a flexible Ethernet device, an Ethernet device, an OTN device, an SDH device, or the like. As shown in FIG. 21, a network device 400 may include a processor 401, a memory 402, at least one network interface (for example, a network interface 403 and a network interface 404), a demultiplexing chip 405, and a multiplexing chip 406. If the network device includes a sending function and a receiving function, the demultiplexing chip 405 and the multiplexing chip 406 may be included; or if the network device includes only a sending function, only the multiplexing chip 406 may be included; or if the network device includes only a receiving function, only the demultiplexing chip 405 may be included.

The processor 401 may be a general purpose central processing unit (Central Processing Unit, CPU), a microprocessor, a network processing unit (Network Processing Unit, NPU), an application-specific integrated circuit (Application-Specific Integrated Circuit, ASIC), or at least one integrated circuit, configured to execute a related program, to implement the technical solutions provided in the embodiments of the present invention.

The memory 402 may be a read-only memory (Read-Only Memory, ROM), a static storage device, a dynamic storage device, or a random access memory (Random Access Memory, RAM). The memory 402 may store an operating system and other application programs. When the technical solutions provided in the embodiments of the present invention are implemented by using software or firmware, program code for implementing the technical solutions provided in the embodiments of the present invention is stored in the memory 402, and is executed by the processor 401.

The network interfaces 403 and 404 may be, for example, but is not limited to a transceiver apparatus such as a transceiver, to implement communication between the network device 400 and another device or communications network. For example, the network interface 403 may have a sending function or a receiving function, or may have both the sending function and the receiving function. The network interfaces 403 and 404 herein may be a logical port (for example, a logical port formed by several timeslots), or may be a physical interface (for example, a 100G flexible Ethernet physical interface).

The demultiplexing chip 405 and the multiplexing chip 406 may be implemented by using the ASIC, a field-programmable gate array (field-programmable gate array, FPGA), or the like, and may be a dedicated chip for implementing the technical solutions of the present invention, or may be a general purpose chip including functions of the technical solutions of the present invention. The demultiplexing chip 405 is configured to demultiplex a received BE service, and the multiplexing chip 406 is configured to multiplex the BE service and send the BE service.

In an example, the network device 400 receives at least one service by using the network interface 403 or 404, and the at least one service includes a best effort BE service. The network device 400 executes, by using the processor 401, the code stored in the memory 402, or executes code stored in the multiplexing chip 406 by using the multiplexing chip 406: The network device obtains at least two data streams, where the at least two data streams include a first data stream and a second data stream; inserts the first data stream into the second data stream, to generate a third data stream, where the third data stream includes a first information block and a second information block, the first information block and the second information block are generated from the second data stream, the first information block is used to carry the first data stream, the second information block is used to carry a first data stream distribution indication map, the first data stream distribution indication map is used to indicate a location of the first information block, and the second information block is identified by using a preset map block type; and sends the third data stream.

In another example, the network device 400 receives, by using the network interface 403 or 404, a data stream carrying a best effort BE service. The network device 400 executes, by using the processor 401, the code stored in the memory 402, or executes code stored in the demultiplexing chip 405 by using the demultiplexing chip 405: The network device receives a third data stream, extracts a first data stream from the third data stream, and restores the third data stream to a second data stream, where the third data stream includes a first information block and a second information block, and the second data stream is restored by using the first information block and the second information block; the first information block is used to carry the first data stream, the second information block is used to carry a first data stream distribution indication map, the first data stream distribution indication map is used to indicate a location of the first information block, and the second information block is identified by using a preset map block type.

Specifically, the network device 400 shown in FIG. 21 may implement the technical solution in any embodiment of the present invention. It should be noted that, although the network device 400 shown in FIG. 21 merely shows the processor 401, the memory 402, the network interfaces 403 and 404, the demultiplexing chip 405, and the multiplexing chip 406, during a specific implementation process, a person skilled in the art should understand that the network device 400 further includes another device required for implementing normal running. In addition, based on a specific need, a person skilled in the art should understand that the network device 400 may further include a hardware device that implements another additional function. For example, the network device 400 further includes a power supply, a fan, a clock unit, a main control unit, and the like. In addition, a person skilled in the art should understand that the network device 400 may alternatively include only devices required for implementing this embodiment of the present invention, and does not necessarily include all the devices shown in FIG. 21.

In this embodiment of the present invention, a BE service may be inserted into an idle timeslot of an original data stream formed by a service with an exclusive bandwidth, thereby improving network bandwidth resource utilization.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A service sending method, wherein the method comprises:
   obtaining, by a network device, at least two data streams, wherein the at least two data streams comprise a first data stream and a second data stream;
   identifying at least two idle blocks in the second data stream;
   generating a first information block and a second information block at locations of the at least two idle blocks;
   inserting the first data stream into the second data stream to generate a third data stream, wherein:
      the third data stream comprises the first information block and the second information block, wherein the first information block and the second information block are generated from the second data stream; and
      the first information block is used to carry the first data stream, wherein the second information block is used to carry a first data stream distribution indication map, wherein the first data stream distribution indication map is used to indicate a location of the first information block, and wherein the second information block is identified by using a preset map block type; and
   sending the third data stream.

2. The method according to claim 1, wherein the generating the first information block and the second information block at locations of the at least two idle blocks comprises:
   inserting the first data stream into the first information block;

generating the first data stream distribution indication map based on the location of the first information block; and
inserting the first data stream distribution indication map into the second information block.

3. The method according to claim 1, wherein the identifying at least two idle blocks in the second data stream comprises:
obtaining a first segment data stream from the second data stream; and
identifying idle blocks in the first segment data stream to obtain at least two idle blocks, wherein each idle block carries an idle block type.

4. The method according to claim 1, wherein after the identifying at least two idle blocks in the second data stream, the method further comprises:
generating an idle block distribution indication map, wherein the idle block distribution indication map is used to indicate at least one of the locations of the at least two idle blocks or a location of a non-idle block; and
generating the first data stream distribution indication map based on the idle block distribution indication map.

5. The method according to claim 4, wherein the method further comprises:
adjusting a location of the second information block to a first location in a first segment data stream or a second segment data stream.

6. The method according to claim 1, wherein the method further comprises:
obtaining a second segment data stream from the second data stream;
identifying at least two idle blocks in the second segment data stream;
generating the first information block and the second information block at locations of the at least two idle blocks; and
indicating a location of the second segment data stream by using preset participation information.

7. A service receiving method, wherein the method comprises:
receiving, by a network device, a third data stream;
extracting a first data stream from the third data stream; and
restoring the third data stream to a second data stream, wherein:
the third data stream comprises a first information block and a second information block;
the second data stream is restored by using the first information block and the second information block, wherein restoring the second data stream comprises generating at least two idle blocks at locations of the first information block and the second information block, and wherein each one of the at least two idle blocks caries an idle block type; and
the first information block is used to carry the first data stream, wherein the second information block is used to carry a first data stream distribution indication map, wherein the first data stream distribution indication map is used to indicate a location of the first information block, and wherein the second information block is identified by using a preset map block type.

8. The method according to claim 7, wherein the extracting a first data stream from the third data stream comprises:

obtaining a first segment data stream or a second segment data stream from the third data stream;
identifying the second information block in the first segment data stream or the second segment data stream;
obtaining the first data stream distribution indication map from the second information block; and
obtaining the first data stream from the first information block based on the first data stream distribution indication map.

9. The method according to claim 8, wherein the method further comprises:
obtaining preset participation information; and
obtaining the second segment data stream from the third data stream based on the preset participation information, wherein the preset participation information indicates a location of the second segment data stream.

10. The method according to claim 8, wherein the extracting a first data stream from the third data stream comprises:
obtaining the first data stream distribution indication map from a first location in the first segment data stream or the second segment data stream.

11. The method according to claim 7, wherein the first data stream distribution indication map identifies the location of the first information block by using a first bit.

12. A service sending apparatus, wherein the apparatus comprises:
a receiver, the receiver configured to obtain at least two data streams, wherein the at least two data streams comprise a first data stream and a second data stream;
at least one processor, the at least one processor configured to:
identify at least two idle blocks in the second data stream;
generate a first information block and a second information block at locations of the at least two idle blocks; and
insert the first data stream into the second data stream, to generate a third data stream, wherein:
the third data stream comprises the first information block and the second information block, wherein the first information block and the second information block are generated from the second data stream; and
the first information block is used to carry the first data stream, wherein the second information block is used to carry a first data stream distribution indication map, wherein the first data stream distribution indication map is used to indicate a location of the first information block, and wherein the second information block is identified by using a preset map block type; and
a transmitter, the transmitter configured to send the third data stream.

13. The apparatus according to claim 12, wherein the at least one processor is configured to:
insert the first data stream into the first information block;
generate the first data stream distribution indication map based on the location of the first information block; and
insert the first data stream distribution indication map into the second information block.

14. The apparatus according to claim 12, wherein the at least one processor is configured to:
obtain a first segment data stream from the second data stream; and
identify idle blocks in the first segment data stream to obtain at least two idle blocks, wherein each idle block carries an idle block type.

15. The apparatus according to claim 12, wherein the at least one processor is further configured to:
  generate an idle block distribution indication map, wherein the idle block distribution indication map is used to indicate at least one of the locations of the at least two idle blocks or a location of a non-idle block; and
  generate the first data stream distribution indication map based on the idle block distribution indication map.

16. The apparatus according to claim 15, wherein the at least one processor is further configured to:
  adjust a location of the second information block to a first location in a first segment data stream or a second segment data stream.

17. The apparatus according to claim 12, wherein the at least one processor is further configured to:
  obtain a second segment data stream from the second data stream;
  identify at least two idle blocks in the second segment data stream;
  generate the first information block and the second information block at locations of the at least two idle blocks; and
  indicate a location of the second segment data stream by using preset participation information.

18. A service receiving apparatus, wherein the apparatus comprises:
  a receiver, the receiver configured to receive a third data stream; and
  at least one processor, the at least one processor configured to extract a first data stream from the third data stream, and restore the third data stream to a second data stream, wherein:
    the third data stream comprises a first information block and a second information block;
    the second data stream is restored by using the first information block and the second information block, wherein restoring the second data stream comprises generating at least two idle blocks at locations of the first information block and the second information block, and wherein each one of the at least two idle blocks caries an idle block type; and
    the first information block is used to carry the first data stream, wherein the second information block is used to carry a first data stream distribution indication map, wherein the first data stream distribution indication map is used to indicate a location of the first information block, and wherein the second information block is identified by using a preset map block type.

19. The apparatus according to claim 18, wherein the at least one processor is configured to:
  obtain a first segment data stream or a second segment data stream from the third data stream;
  identify the second information block in the first segment data stream or the second segment data stream;
  obtain the first data stream distribution indication map from the second information block; and
  obtain the first data stream from the first information block based on the first data stream distribution indication map.

20. The apparatus according to claim 19, wherein the at least one processor is configured to:
  obtain preset participation information; and
  obtain the second segment data stream from the third data stream based on the preset participation information, wherein the preset participation information indicates a location of the second segment data stream.

21. The apparatus according to claim 19, wherein the at least one processor is configured to:
  obtain the first data stream distribution indication map from a first location in the first segment data stream or the second segment data stream.

22. The apparatus according to claim 18, wherein the first data stream distribution indication map identifies the location of the first information block by using a first bit.

23. A network system, wherein the system comprises a service sending apparatus and a service receiving apparatus, wherein the service sending apparatus is configured to:
  obtain at least two data streams, wherein the at least two data streams comprise a first data stream and a second data stream;
  identify at least two idle blocks in the second data stream;
  generate a first information block and a second information block at locations of the at least two idle blocks; and
  insert the first data stream into the second data stream to generate a third data stream and send the third data stream;
  wherein the third data stream comprises the first information block and the second information block, wherein the first information block and the second information block are generated from the second data stream, wherein the first information block is used to carry the first data stream, wherein the second information block is used to carry a first data stream distribution indication map, wherein the first data stream distribution indication map is used to indicate a location of the first information block, and wherein the second information block is identified by using a preset map block type;
wherein the service receiving apparatus is configured to:
  receive the third data stream;
  extract a first data stream from the third data stream; and
  restore the third data stream to a second data stream.

* * * * *